United States Patent [19]
O'Toole et al.

[11] Patent Number: 6,114,417
[45] Date of Patent: Sep. 5, 2000

[54] PAPER SIZING AGENTS AND METHODS

[75] Inventors: Michael Philip O'Toole, Norwalk; Otto S. dePierne, East Norwalk, both of Conn.

[73] Assignee: Cytec Technology Corp., Wilmington, Del.

[21] Appl. No.: 09/174,076

[22] Filed: Oct. 16, 1998

[51] Int. Cl.$^7$ .................................. C08L 5/00; C08F 2/16
[52] U.S. Cl. .................................. 524/27; 524/28; 524/35; 524/47; 524/732; 524/734; 524/458; 524/459; 162/164.1; 162/164.6; 162/168.1; 162/175; 162/176; 162/177; 162/180
[58] Field of Search .................................. 524/27, 28, 35, 524/47, 458, 459, 732, 734; 162/164.1, 164.6, 168.1, 175, 176, 177, 180

[56] References Cited

U.S. PATENT DOCUMENTS

| | | |
|---|---|---|
| 3,061,471 | 10/1962 | Brockway et al. . |
| 3,061,472 | 10/1962 | Brockway . |
| 4,001,193 | 1/1977 | von Bonin et al. . |
| 4,030,970 | 6/1977 | Tominaga et al. . |
| 4,115,331 | 9/1978 | Tominaga et al. . |
| 4,171,407 | 10/1979 | Elser et al. . |
| 4,434,269 | 2/1984 | Probst et al. . |
| 4,560,724 | 12/1985 | Brabetz et al. ........................ 524/734 |
| 4,659,431 | 4/1987 | Probst et al. . |
| 4,661,557 | 4/1987 | Bubam et al. . |
| 4,835,212 | 5/1989 | Degen et al. . |
| 4,855,343 | 8/1989 | Degen et al. . |
| 5,004,767 | 4/1991 | Krause et al. . |
| 5,082,896 | 1/1992 | Chan . |
| 5,138,004 | 8/1992 | dePierne et al. . |
| 5,139,614 | 8/1992 | dePierne et al. . |
| 5,231,145 | 7/1993 | Brueckmann et al. . |
| 5,240,771 | 8/1993 | Brueckmann et al. . |
| 5,258,466 | 11/1993 | Sackmann et al. . |
| 5,288,787 | 2/1994 | Sackmann et al. . |
| 5,358,998 | 10/1994 | Wendel et al. . |
| 5,679,735 | 10/1997 | Geissler et al. . |

FOREIGN PATENT DOCUMENTS

| | | |
|---|---|---|
| 0173 300 A1 | 3/1986 | European Pat. Off. . |
| WO 94/05855 | 3/1994 | WIPO . |
| WO 96/34699 | 11/1996 | WIPO . |
| WO 97/37078 | 10/1997 | WIPO . |
| WO 99/09251 | 2/1999 | WIPO . |

OTHER PUBLICATIONS

T. Aslamazova, Colloids and Surfaces A:Physico chemical and Engineering Aspects 104(1995) 147–155, "Polymer–monomer and polymer–interactions and their effect on the stability of emulsifier–free acrylate latexes".

Zushun Zu, Polymer International 44(1997) 149–155, "Styrene–butyl Acrylate–N,N–Dimethyl–N–butyl–N–Methacrylamiedino Propyl Ammonium Bromide Emulsifier–free Emulsion Copolymerization".

Yi–Guan Tsai, "An Alternative Chemistry for Paper; Surface Size with High Performance and A Large Window of Operation," 1995 Papermakers Conference TAPPI Proceedings, pp. 427–434.

M. Watson, "The Surface Treatment of Fine Business Papers," Ed J. Bronder, Surface Application of Paper Chemicals, Blackie, London (1997), pp. 192–207.

T. R. Aslamazova, "Influence of Functional Comonomers on the Stability of Emulsifier–Free Acrylate Latexes," 1995, Colloid Journal, vol. 57, No. 2, 1995.

T. R. Aslamazova, "Role of Polymer–Polymer–Monomer Interactions in the Stabilization of Emulsifier–Free Latexes," 1995, Colloid Journal, vol. 57, No. 2 1995, pp. 135–142.

*Primary Examiner*—Nathan M. Nutter
*Attorney, Agent, or Firm*—Joseph J. Mallon

[57] ABSTRACT

Sizing agents comprised of dispersed synthetic polymers in an aqueous solution are provided, as well as methods for making these sizing agents and methods for using these sizing agents to size paper. Improved sizing is obtained by including recurring units of methyl acrylate, ethyl acrylate and/or propyl acrylate in the synthetic polymers.

20 Claims, No Drawings

PAPER SIZING AGENTS AND METHODS

FIELD OF THE INVENTION

This invention relates to improvements in the sizing of cellulose-based products e.g. paper. More particularly, it relates to a method for making a sizing agent comprising copolymerizing a mixture of ethylenically unsaturated monomers in the presence of water to form a sizing dispersion, sizing agents obtainable by this method, and to methods of sizing cellulose-based products using these sizing agents.

BACKGROUND OF THE INVENTION

Synthetic polymers are widely used as sizing agents for cellulose-based products, e.g. paper, paperboard, etc. When added or applied during or at the conclusion of the papermaking process, sizing agents generally improve paper properties such as printability by imparting a more hydrophobic character to the surface of the paper and thereby preventing or reducing the flow of ink into or across the surface of the paper. The polymers that impart these characteristics to the paper generally have a hydrophobic nature and therefore may be soluble or insoluble in aqueous solution, depending on the level of hydrophobicity incorporated. When soluble in water, they may be supplied to the user in the form of an aqueous solution. When insoluble in water, they may be conveniently supplied to the user in the form of aqueous dispersions or emulsions in which small particles or droplets of the sizing polymer are dispersed throughout an aqueous solution.

These aqueous dispersions or emulsions are generally formed by polymerizing or copolymerizing monomers in the presence of water. To facilitate the formation of a dispersion or emulsion and to prevent the forming polymer from immediately coagulating into a large mass, emulsifiers and surfactants are frequently present during the polymerization to aid in the formation of the dispersion and/or stabilize the final product. For instance, in WO 97/37078 it is stated that anionic, cationic, amphoteric and nonionic emulsifiers can be used. However, in some cases the use of surfactants and/or emulsifiers can lead to undesirable foaming and lower sizing when present during the papermaking process.

Many conventional polymeric sizing agents contain recurring units of an ethylenically unsaturated comonomer which contains carboxylic acid or sulfonic acid groups or salts thereof, see e.g. WO 97/37078 and U.S. Pat. Nos. 5,240,771; 5,231,145; 5,139,614; 5,138,004; 4,115,331; 4,030,970; and 4,001,193, all of which are hereby incorporated herein by reference. However, since the salt and acid forms often have different solubilities, the inclusion of these recurring units in surface sizes may have the undesirable effect of increasing the pH sensitivity of the sizing agent, in some cases so much so that the ability of the sizing agent to function for its intended purpose is greatly impaired.

In recent years, other sizing agents e.g. styrene/acrylate emulsions have been developed which do not include recurring units of an ethylenically unsaturated comonomer which contains carboxylic acid or sulfonic acid groups or salts thereof. However, even for sizing agents in which inclusion of these units is optional, see e.g. U.S. Pat. No. 4,835,212, there remains a problem in that further improvements in sizing ability and/or dispersion stability are desired.

Thus, there is a problem in that existing sizing agents often contain undesirable levels of surfactants, emulsifiers and/or acidic recurring units, see e.g. U.S. Pat. No. 5,258,466. The simple expedient of removing these components from the formulation has proven to be unsatisfactory because elimination often causes undesirable reductions in sizing ability and/or dispersion stability. Therefore, the problem of reducing surfactant, emulsifier and/or acid component levels in sizing agents is complicated by the need to retain or improve sizing ability and dispersion stability.

Surprisingly, it has now been discovered that sizing agents may be prepared by polymerizing the monomer components of a mixture of monomers, where the mixture contains effective amounts of methyl acrylate, ethyl acrylate or propyl acrylate, and a stabilizing agent in the presence of water and in the absence of both (a) ethylenically unsaturated carboxylic and sulfonic acids and salts thereof and (b) emulsifier or surfactant having a molecular weight of less than about 1,000, to give dispersions having the ability to impart a degree of sizing to cellulose-based products that is as good as or better than comparable products which contain acidic recurring units and/or emulsifier or surfactant and/or lack effective amounts of methyl acrylate, ethyl acrylate or propyl acrylate. Surprisingly, the sizing dispersions of the instant invention also exhibit the improved physical stability often associated with ethylenically unsaturated carboxylic and sulfonic acids and salts and/or emulsifier or surfactant without the use of these components.

SUMMARY OF THE INVENTION

The instant invention relates to a method for making a sizing agent comprising
  (I) forming a mixture comprised of
    (A) 5–40%, by weight based on total weight, of ethylenically unsaturated monomers comprised of
      (1) 20–80%, by mole based on total moles of monomers, of at least one monomer selected from the group consisting of styrene, $C_1$–$C_4$ alkyl substituted styrene, alpha-methyl styrene and ring-halogenated styrene,
      (2) 0–80%, by mole based on total moles of monomers, of at least one $C_4$–$C_{12}$ alkyl (meth) acrylate monomer,
      (3) 5–50%, by mole based on total moles of monomers, of at least one monomer selected from the group consisting of methyl acrylate, ethyl acrylate, and propyl acrylate, and
    (B) a stabilizing agent selected from the group consisting of polysaccharide and synthetic water-soluble polymer having a weight average molecular weight of 1,000 or greater,
wherein the ratio of said (A) to said (B) in said mixture is in the range of about 0.6:1 to about 1.7:1 and wherein said mixture is substantially free of both (i) ethylenically unsaturated carboxylic and sulfonic acids and salts thereof and (ii) emulsifier or surfactant having a molecular weight of less than 1,000, and
  (II) copolymerizing said ethylenically unsaturated monomers in the presence of water to form a dispersion.

The instant invention also relates to a sizing agent comprised of:
  (A) 5–40%, by weight based on total weight, of a synthetic polymer comprised of recurring units of
    (1) 20–80%, by mole based on total moles of recurring units, of at least one recurring unit selected from the group consisting of styrene, $C_1$–$C_4$ alkyl substituted styrene, alpha-methyl styrene and ring-halogenated styrene,
    (2) 0–80%, by mole based on total moles of recurring units, of at least one $C_4$–$C_{12}$ alkyl (meth)acrylate recurring unit, (3) 5–50%, by mole based on total moles of recurring units, of at least one recurring unit selected from the group consisting of methyl acrylate, ethyl acrylate, and propyl acrylate, and (B) a stabilizing agent selected from the group consisting of polysaccharide and synthetic water-soluble polymer having a weight average molecular weight of 1,000 or greater, wherein the weight ratio of said (A) to said (B) in said sizing agent is in the range of about 0.6:1 to about 1.7:1, wherein said sizing agent is substantially free of emulsifier or surfactant having a molecular weight of less than 1,000, and wherein said synthetic polymer is substantially free of acidic recurring units.

The instant invention also relates to a method of sizing paper, comprising (a) providing paper stock;

(b) providing the sizing agent described above;

(c) forming a web from said paper stock; and (d) mixing said sizing agent with said paper stock or applying said sizing agent to said web, in an amount effective to size paper that is formed from said web.

DETAILED DESCRIPTION

The sizing agents of this invention are generally dispersions of water-insoluble polymers in aqueous solutions. The dispersed polymer particles or droplets are obtainable by polymerization of the corresponding monomers in the presence of water. The polymerization is generally carried out by forming a mixture comprised of water and from about 5% to about 40%, preferably about 8% to about 30%, more preferably about 10% to about 25%, by weight based on total weight the dispersion, of ethylenically unsaturated monomers, and subjecting the mixture to polymerization conditions, preferably with stirring and preferably in the presence of a stabilizing agent. The resulting sizing dispersion or sizing agent, as those terms are used herein, is an aqueous dispersion comprised of finely divided dispersed water-insoluble polymer particles in aqueous solution, preferably containing a stabilizing agent.

The ethylenically unsaturated monomers are generally comprised of two or three types of monomers, enumerated herein as (1), (2) and (3). Thus, the ethylenically unsaturated monomers are generally comprised of (1) about 20% to about 80%, preferably about 30% to about 75%, most preferably about 40% to about 60%, by mole based on total moles of monomers, of at least one monomer selected from the group consisting of styrene, alpha-methylstyrene, $C_1$–$C_4$ alkyl substituted styrene, e.g. vinyltoluene, and ring-halogenated styrene, e.g. chlorostyrene. Styrene is preferred.

The ethylenically unsaturated monomers may also be comprised of (2) from about zero (0%) to about 80%, preferably 10% to about 60%, most preferably about 20% to about 50%, by mole based on total moles of monomers, of at least one $C_4$–$C_{12}$ alkyl (meth)acrylate monomer. Suitable monomers include: n-butyl (meth)acrylate, isobutyl (meth)acrylate, t-butyl (meth)acrylate, neopentyl (meth)acrylate, hexyl (meth)acrylate, cyclohexyl (meth)acrylate, 2-ethylhexyl (meth)acrylate, heptyl (meth)acrylate, octyl (meth)acrylate, decyl (meth)acrylate, palmityl (meth)acrylate and stearyl (meth)acrylate. Butyl acrylate is preferred.

The ethylenically unsaturated monomers are also generally comprised of (3) from about 5% to about 50%, preferably from about 8% to about 30%, most preferably about 10% to about 20%, by mole based on total moles of monomers, of at least one monomer selected from the group consisting of methyl acrylate, ethyl acrylate and propyl acrylate. Methyl acrylate and ethyl acrylate are preferred. Surprisingly, the inclusion of methyl acrylate, ethyl acrylate and/or propyl acrylate generally allows for the formation of sizing agents which provide satisfactory or improved sizing effects without the need for ethylenically unsaturated carboxylic and sulfonic acids and salts thereof or emulsifier or surfactant having a molecular weight of less than about 1,000.

In addition to the ethylenically unsaturated monomers of (1), (2), and (3), other ethylenically unsaturated monomers may also be included. Examples of other suitable monomers which may be copolymerized with the monomers of (1), (2) and (3) include (meth)acrylamide, alkyl (meth)acrylamide and hydroxy functional monomers e.g. hydroxyethylmethacrylate and hydroxyethylacrylate. Acrylamide is preferred. Amounts of these other ethylenically unsaturated monomers are generally about 20% or less, preferably 10% or less, by mole based on total moles of monomers. In terms of amounts, the mole percentages of the ethylenically unsaturated monomers (1), (2), (3) and other monomers always adds up to 100.

Polymerization of the ethylenically unsaturated monomers is generally conducted by stirring or otherwise agitating the monomers in water and subjecting the monomers to polymerization conditions. Polymerization may be initiated, preferably in the absence of oxygen and in the presence of an inert gas e.g. nitrogen, by adding a suitable polymerization initiator. Initiators include conventional initiators, such as ammonium persulfate, hydrogen peroxide, hydroperoxide, benzoyl peroxide, organic peroxides and azo-type initiators e.g. 2,2'-azobisisobutyronitrile (AIBN), as well as redox systems such as sulfur dioxide/hydrogen peroxide, sulfur dioxide/t-butyl hydroperoxide, sulfur dioxide/sodium bromate, iron(II)/hydrogen peroxide, iron (II)/sodium persulfate, iron(II)/potassium persulfate, iron (II)/ammonium persulfate, ammonium persulfate/sodium metabisulfite, sodium persulfate/sodium metabisulfite, potassium persulfate/sodium metabisulfite, and peroxy redox initiators. Iron(II)/hydrogen peroxide is preferred. Ultraviolet radiation may be used to initiate polymerization. Polymerization temperatures are generally in the range of about 20° C. to about 100° C., depending on the type of initiator, although higher or lower temperatures may occasionally be suitable. For instance, the polymerization temperature may be adjusted to prevent undesirable volatilization of monomers during polymerization. Preferably a conventional initiator, more preferably hydrogen peroxide, is added at or near the end of the polymerization to lower the residual monomer content of the resulting aqueous dispersion.

The polymerization process may be conducted in the form of a batch or by feeding the monomers either continuously or in steps, or any combination thereof. Water may also be added at any time during the polymerization process as well as additional aliquots of initiator or other polymerization aids. Preferably polymerization of the ethylenically unsaturated monomers is conducted in the presence of a stabilizing agent which stabilizes the final product. For instance, a mixture comprised of the monomers, a suitable stabilizing agent and water may be prepared, then the monomers polymerized as described herein to form a sizing dispersion. The amount of stabilizing agent is preferably about 8% to about 30%, more preferably about 10% to about 20%, by weight based on the total weight of the dispersion. The weight ratio of ethylenically unsaturated monomers to stabilizing agent in the mixture is generally in the range of about 0.6:1 to about 1.7:1, preferably about 0.8:1 to about 1.5:1, most preferably about 0.9:1 to about 1.2:1. Since complete conversion of monomers to polymers is generally achieved by the practice of the instant invention, the weight ratio of ethylenically unsaturated monomers to stabilizing agent in the mixture is generally equivalent to the weight ratio of formed polymer to stabilizing agent in the resultant sizing dispersion.

A suitable stabilizing agent is polysaccharide. The polysaccharide may be a water soluble alginate (sodium or potassium), carboxymethyl cellulose, hydroxyethyl cellulose, or a starch, preferably a starch. Suitable starches include: barley, wheat, potato, corn, waxy maize, rice, tapioca, sorghum, wheat, preferably waxy maize. The starch may be converted e.g. enzyme, acid, thermochemical and oxidized, preferably oxidized. The starch may also be modified, e.g. acid and pregelatinized. The starch may also be chemically treated, e.g. etherification, esterification, crosslinked, ionic, e.g. cationic, anionic and amphoteric, preferably cationic. Starches which have been treated by a combination of the aforementioned may also be used, as well as mixtures of the aforementioned starches. A preferred starch is cationic, most preferably oxidized cationic waxy maize starch.

Another suitable, though less preferred, stabilizing agent is a synthetic water-soluble polymer having a weight average molecular weight of about 1,000 or greater, preferably about 5,000 or greater, even more preferably greater than about 15,000, most preferably about 20,000 or greater. Molecular weights are weight average, as measured by conventional high pressure size exclusion chromatography techniques using suitable molecular weight standards e.g. Pullulan polysaccharide standards. Suitable synthetic water-soluble polymers include such polymers as polyvinyl alcohol and polyacrylamide. Preferably, such synthetic water-soluble polymers are not acid-containing copolymers e.g. are preferably substantially free of recurring units of acid-containing monomers.

The ethylenically unsaturated monomers are generally polymerized, preferably in the presence of a stabilizing agent, in the presence of about 30% to about 85% of water, preferably about 55% to about 80%, by weight based on total weight, to form a sizing dispersion. The mixture of monomers is preferably substantially free of acrylic acid, methacrylic acid and other ethylenically unsaturated carboxylic acids, sulfonic acids, and salts thereof. Surprisingly, it has been discovered that improved sizing may be obtained even when these acidic monomers are not included in the polymerization system. Also, the mixture is generally substantially free of emulsifier or surfactant. In this context, emulsifiers or surfactants are generally non-polymeric, preferably having a molecular weight of less than about 1,000, most preferably less than about 800.

The sizing dispersions prepared as described herein are thus generally comprised of a water-insoluble polymer that is dispersed in an aqueous solution, preferably containing a stabilizing agent. Although in theory the water-insoluble polymer could be prepared by some other method, then dispersed in water to provide the instant sizing agents, it is much preferred to prepare these sizing agents by polymerization of the corresponding monomers as described herein. Therefore, the sizing dispersions of the instant invention generally contain the amounts of the various components that are described herein as being present during the polymerization process or, in the case of the monomers, the polymers resulting therefrom. For instance, since total conversion of the monomers to polymer is generally obtained by the practice of the instant invention, the water-insoluble polymer generally contains recurring units in the same amounts as described herein for the corresponding monomers in the polymerization mixture. The types and amounts of recurring units in the water-insoluble polymer are thus described herein in terms of the corresponding monomers e.g., the water-insoluble polymer generally contains recurring units of monomers (1), (2) and (3), and optionally other recurring units, as described herein. Likewise, the water-insoluble polymer is preferably substantially free of acidic recurring units as described above, since the monomer mixture from which the polymer is preferably formed is itself preferably free of ethylenically unsaturated carboxylic acids, sulfonic acids, and salts thereof. The instant sizing agents are generally substantially free of emulsifier or surfactant having a molecular weight of less than 1,000, preferably contain a stabilizing agent as described above, and the weight ratio of water-insoluble polymer to stabilizing agent in the sizing agent is generally in the same range as specified above e.g. in the range of about 0.6:1 to about 1.7:1, preferably about 0.8:1 to about 1.5:1, most preferably about 0.9:1 to about 1.2:1. Likewise, the amount of water in the aqueous dispersions is generally about 30% to about 85%, preferably about 55% to about 80%, by weight based on total weight, as described herein.

The sizing dispersions of the instant invention generally exhibit good physical stability. Although there may be cases in which good physical stability is not required, e.g. when the sizing dispersion is utilized soon after it is made, in most cases good physical stability is preferred. A sizing dispersion is stable, for the purposes of the instant invention, when the dispersed particles or droplets of polymer do not settle and/or coagulate before use. Preferably, the dispersed particles or droplets of polymer do not settle and/or coagulate before about 1 week has elapsed since the preparation of the dispersion, more preferably about 1 month, most preferably about 3 months.

The sizing agents of this invention are generally used to size cellulose-based products. For instance, the sizing agents of this invention may be mixed with a paper stock, the paper stock may be formed into a web, and paper may be formed from the web. Also, the sizing agents of this invention may be applied to a web formed from paper stock and paper may be formed from the sized web. Generally the amount of sizing agent is effective to size paper that is formed from the web. Suitable amounts of sizing agent range from about 0.05% to 5%, preferably from 0.1% to 0.4%, by weight of dry polymer based on total weight of dry cellulose-based product. Conventional means known in the art may be used to apply the sizing agent to the cellulose-based product. For instance, the sizing agent may be sprayed onto the web or a size press may be used to apply the sizing agent to the paper, or it may be applied as part of the conversion process using conventional coating techniques. The sizing agents of this invention may be used in conjunction with or serially with other additives conventionally used in the production of cellulose-based products.

When practiced in accordance with the instant invention, paper formed from a web to which the instant sizing agents have been applied has a degree of sizing that is greater than when a sizing agent that does not contain recurring units selected from the group consisting of methyl acrylate, ethyl acrylate, and propyl acrylate is used in place of the sizing agent of the invention. Improved sizing may be manifested by an observation of e.g. less ink feathering, sharper letter image, better optical density and/or contrast, less color bleed and/or better toner adhesion, less ink penetration, shorter drytime, etc. Other advantages of the sizing agents of this invention include less foaming in use, usable over a wider range of pH, and higher glass transition temperature, which often translates to decreased stickiness. The polymerization process of the ethylenically unsaturated monomers also tends to proceed more rapidly, and the product of the process can generally be prepared at a higher level of polymer solids and with a smaller particle size and narrower particle size distribution, providing less costly and more uniform product. The process also often gives a product having lower residual monomer and less coagulum.

In many cases one or more improved properties may be obtained simultaneously in a given product, but in other cases it may be desirable for economic or other reasons to obtain a product having improved properties in one area and equivalent or even decreased properties in another area. For instance, in the making of paperboard, very high levels of sizing may be desirable, even where the level of sizing begins to detrimentally affect a property that is normally associated with good sizing such as printability. Thus, those skilled in the art realize that, in the context of actual production, it is frequently necessary or desirable to balance the benefits of various improvements against their costs, depending on the particular circumstances.

The invention is further illustrated in the following examples which are not to be construed as limiting the scope of the invention. All parts and percentages are by weight based on total weight, unless otherwise indicated.

General Tubsizing Procedure

A typical commercially available oxidized starch for size press operations is cooked at 20 wt % for 20 minutes, diluted to 3 wt%, then NaOH solution is added to provide a starch solution with a pH of 7.1–7.8. Various amounts of sizing agent are added to samples of this starch solution to produce sizing solutions having slightly less than 3 wt % starch. Weighed sheets of internally-sized paper, having a weight of about 70 grams/meter$^2$, are cut to a suitable size, dipped into the various sizing solutions, pressed at a pressure of 1.5 lbs, and then dried at 240° F. for 30 seconds. The sheets are weighed after drying, and sizing levels are reported below in units of lb/ton, i.e. pounds of dry polymer per ton of dry paper.

Sizing Effectiveness Tests

The effectiveness of the sizing agents was variously determined by performing Ink Penetration, Print Quality, Color Density, Optical Density, Drying Time, and Toner Adhesion tests on the sized paper. The Foam Test was also used to measure the effectiveness of the sizing agents in terms of the tendency for the sizing agents to foam during application. The general procedures for these tests are provided below.

Ink Penetration

The Ink Penetration test method is similar to TAPPI Method T 530 pm-89 except that an instrument as described in U.S. Pat. No. 5,483,078 is used. The test measures the time (in seconds) for the reflectance of the paper on the side opposite that contacting the ink to decrease to 80% of the initial value. The ink is 1.25% Napthol Green B dye solution that is buffered to pH 7. The test values are normalized for basis weight of the paper by assuming that the values vary as the cube of the basis weight. Results are expressed below in units of seconds. Longer times are generally indicative of better sizing.

Print Quality

Print quality (PQ) tests were performed by first printing six Courier 9 point letters (e, o, j, m, v, and d) onto the paper using a commercially available ink-jet printer. The areas of the six letters were then measured using a commercially available image analysis system equipped with morphometry application, stereo zoom microscope with CCD camera and ring fiber optic illumination. Images of the six characters were summed to give a total letter area. A smaller letter area is generally indicative of better sizing because it corresponds to less spreading or wicking of the inked area. Results are expressed below in units of mm$^2$.

Color Density

Color density (CD) was determined by measuring the areas of composite black characters printed on a yellow background. The measurement procedure was similar to that used to measure the areas of the letters in the Print Quality test, except that yellow letters were printed onto a black background using a color ink-jet printer. Results are expressed below in units of inverse mm$^2$. A higher color density value is generally indicative of better sizing.

Optical Density

Solid black 1 cm$^2$ areas were printed onto the sheet to be tested. The Optical Density (OD) of the printed areas were measured with a commercially available Macbeth® press-room densitometer. Values provided below are the mean of four measurements in each of two areas are reported below in units of inverse mm$^2$. A higher optical density value is generally indicative of better sizing.

Toner Adhesion Test

The Toner Adhesion Test measures the adhesion of print toner to cellulose-based products e.g. paper. The test is conducted by copying a standard toner adhesion testing pattern consisting of nine small black blocks onto a sample sheet using a commercially available photocopier. The samples are then folded and rolled with a 5-pound roller and the crease was lightly brushed to remove excess toner. The image analyzer used for the Print Quality test was then used to produce a measurement of Total Object Area by measuring the amount of white produced by the fold negating the image. Since this test measures the area where toner was removed, a lower Total Object Area value is generally more desirable. Results are reported below in units of mm$^2$.

Drying Time

Drying time (also known as dry time or drytime) is a measurement of the time required for ink to dry after being applied to a cellulose-based product e.g. paper. The test is conducted by first printing a grid onto the left-hand side of a piece of paper, then printing a thick black line onto the right-hand side of the paper. The paper is then quickly folded and pressure is applied to the paper with a 5-pound roller. If the ink dries very quickly, the ink in the thick black line will not transfer to the grid. However, if the ink dries slowly, at least a portion of the thick black line will be transferred to the grid. The dry time is determined by measuring the length of the transferred black line on the grid and is reported below in units of length (centimeters).

Foam Test

The results of the Foam Test are used as an indication of the amount of foaming that may be expected during papermaking. It is conducted by adding 125 parts of sizing solution (prepared by intermixing sizing agent and starch as described in the General Tubsizing Procedure provided above) and 5 drops of a neutral blue ink to a commercially available graduated laboratory blender, running the blender at the highest speed setting for 10 seconds, then stopping the blender. The height of the foam is recorded immediately after blending is stopped, and the time for the foam to drop to a specified height is recorded. The results below are reported in units of minutes and seconds. A shorter time generally corresponds to less foaming.

Particle Size and Particle Size Distribution Measurements

Microscopy: A commercially available Transmission Electron Microscope equipped with automated image analysis was used to examine samples of sizing agents by coating a grid with carbon, placing a dilute drop of sizing agent onto the carbon, then allowing the solution to evaporate to deposit the polymer particles on the grid. The results are reported below as the mean average diameter of the particles in units of nanometers (surface-volume method).

Light Scattering: A commercially available light scattering particle analyzer (Horiba) was used to determine the particle size of samples of sizing agents. Results are reported below as the median particle size, in units of microns, and as the percentage of particles having a diameter of less than one micron.

EXAMPLE A

Preparation of Stabilizing Agent

A stabilizing agent was prepared as follows: About 61.0 parts of water were added to a suitable vessel equipped with stirrer, followed by 0.8 parts ammonium persulfate and 15.8 parts of a commercially available cationic waxy maize starch for a total of 77.6 parts. The starch was oxidized by heating at 90° C. for 130 minutes, then cooling.

EXAMPLE B

Preparation of Stabilizing Agent

A stabilizing agent was prepared as follows: About 134.3 parts of water were added to a suitable vessel equipped with stirrer, followed by 2.7 parts ammonium persulfate and 59.3 parts of a commercially available cationic waxy maize starch. The starch was oxidized by heating at 90° C. for 130 minutes, then cooling.

EXAMPLE C

Preparation of Stabilizing Agent

A stabilizing agent was prepared as follows: About 165.0 parts of water were added to a suitable vessel equipped with stirrer, followed by 2.2 parts ammonium persulfate and 45.2 parts of a commercially available cationic waxy maize starch to give a total of about 212.5 parts. The starch was oxidized by heating at 90° C. for 130 minutes, then cooling.

EXAMPLE 1

A sizing agent was prepared as follows: About 0.1 part ferrous sulfate heptahydrate was added to about 76.4 parts of a stabilizing agent prepared as in Example A, followed by 7.4 parts styrene, 8.8 parts n-butyl acrylate, and 1.4 parts methyl acrylate. The reaction vessel was heated to about 57° C. under a nitrogen atmosphere. About 0.4 part hydrogen peroxide and about 3.4 parts water were added over the course of about 2.5 hours while maintaining the temperature at 58°±2° C. About 0.03 part hydrogen peroxide and 0.27 part water were then added to reduce residual monomer, followed by 0.3 part sodium hydroxide and 0.3 part water. The resulting sizing agent was an aqueous dispersion having 17.6% formed polymer solids and 15.7% stabilizing agent, by weight based on total weight (1.12:1 ratio).

EXAMPLE 2C (Comparative)

A comparative sizing agent was prepared without using methyl acrylate as follows: About 0.1 part ferrous sulfate heptahydrate and 0.3 part water were added to about 76.4 parts of a stabilizing agent prepared as described in Example A, followed by 8.1 parts styrene and 9.5 parts n-butyl acrylate. The reaction vessel was heated to about 57° C. under a nitrogen atmosphere. About 0.4 parts hydrogen peroxide and about 1.5 parts water were added over the course of about 2.5 hours, while maintaining the temperature at about 58°±2° C. About 0.03 part hydrogen peroxide and about 0.13 part water were then added to reduce residual monomer, followed by about 0.3 part sodium hydroxide and 0.8 part water. The resulting comparative sizing agent was an aqueous dispersion having 17.6% formed polymer solids and 15.7% stabilizing agent, by weight based on total weight (1.12:1 ratio).

EXAMPLE 3

Sizing agents prepared as in Examples 1 and 2C were used to size paper by the general tubsizing procedure described above. The effectiveness of sizing was determined by the Print Quality test (at sizing levels of 2 lb/ton and 4 lb/ton) and by the Ink Penetration test (at a sizing level of 4 lb/ton) as described above. The results are provided below in Table 1 and show that the sizing agent of the instant invention provided both improved print quality and improved ink penetration.

TABLE 1

| Sizing Agent of | Print Quality (mm²) | | Ink Penetration (seconds) |
| --- | --- | --- | --- |
| Example No. | 2 lb/ton | 4 lb/ton | 4 lb/ton |
| 1 | 1.835 | 1.766 | 215 |
| 2C | 1.871 | 1.801 | 179 |

EXAMPLE 4

A sizing agent was prepared as follows: About 0.1 part ferrous sulfate heptahydrate was added to about 76.4 parts of a stabilizing agent prepared as in Example A, followed by 8.1 parts styrene, 6.9 parts n-butyl acrylate, and 2.6 parts methyl acrylate. The reaction vessel was heated to about 58° C. under a nitrogen atmosphere. About 0.4 part hydrogen peroxide and about 3.4 parts water were added over the course of about 2.5 hours while maintaining the temperature at 58°±2° C. About 0.03 part hydrogen peroxide and 0.27 part water were then added to reduce residual monomer, followed by 0.3 part sodium hydroxide and 0.8 part water. The resulting sizing agent was an aqueous dispersion having 17.6% formed polymer solids and 15.7% stabilizing agent, by weight based on total weight (1.12:1 ratio).

EXAMPLE 5

Sizing agents prepared as in Examples 4 and 2C were used to size paper by the general tubsizing procedure described above at a sizing agent level of 4 lb/ton. The drying times for the sized papers were determined by the drying time procedure described above. The results shown below in Table 2 show that the sizing agents of the instant invention provide faster drying times than comparative sizing agents.

TABLE 2

| Sizing Agent of Example No. | Drying Time (cm) |
| --- | --- |
| 4 | 7.2 |
| 2C | 7.9 |

EXAMPLE 6

A sizing agent was prepared as follows: About 0.1 part ferrous sulfate heptahydrate was added to about 76.4 parts of a stabilizing agent prepared as in Example A, followed by 8.7 parts styrene, 7.0 parts n-butyl acrylate, and 2.2 parts methyl acrylate. The reaction vessel was heated to about 58° C. under a nitrogen atmosphere. About 0.4 part hydrogen peroxide and about 3.4 parts water were added over the course of about 2.5 hours while maintaining the temperature at about 60°±3° C. About 0.03 part hydrogen peroxide and 0.27 part water were then added to reduce residual monomer, followed by 0.3 part sodium hydroxide and 0.8 part water. The resulting sizing agent was an aqueous dispersion having 17.6% formed polymer solids and 15.7% stabilizing agent, by weight based on total weight (1.12:1 ratio).

EXAMPLE 7

Sizing agents prepared as in Examples 6 and 2C were used to size paper by the general tubsizing procedure described above at a sizing agent level of 2 lb/ton. The effectivenss of sizing was determined by the Toner Adhesion Test (at a sizing level of 2 lb/ton) and the by the Foam Test (at a sizing level of 4 lb/ton) as described above. The results shown below in Table 3 show that the sizing agents of the instant invention provide better toner adhesion and foam time than comparative sizing agents.

TABLE 3

| Sizing Agent of Example No. | Toner Adhesion, mm² (2 lb/ton) | Foam Time (4 lb/ton) |
| --- | --- | --- |
| 6 | 0.391 | 6 min. 0 sec. |
| 2C | 0.520 | 6 min. 40 sec. |

EXAMPLE 8

A sizing agent was prepared as follows: About 0.1 part ferrous sulfate heptahydrate was added to about 76.4 parts of a stabilizing agent prepared as in Example A, followed by 8.9 parts styrene, 3.7 parts n-butyl acrylate, and 5.0 parts methyl acrylate. The reaction vessel was heated to about 58° C. under a nitrogen atmosphere. About 0.4 part hydrogen peroxide and about 3.4 parts water were added over the course of about 2.5 hours while maintaining the temperature at about 60°±3° C. About 0.03 part hydrogen peroxide and 0.27 part water were then added to reduce residual monomer, followed by 0.3 part sodium hydroxide and 0.8 part water. The resulting sizing agent was an aqueous dispersion having 17.6% formed polymer solids and 15.7% stabilizing agent, by weight based on total weight (1.12:1 ratio).

EXAMPLE 9

Sizing agents prepared as in Examples 8 and 2C were used to size paper by the general tubsizing procedure described above. The effectiveness of sizing was determined by the Print Quality test (at sizing levels of 2 lb/ton and 4 lb/ton) and by the Ink Penetration test (at sizing levels of 2 lb/ton and 4 lb/ton) as described above. The results are provided below in Table 4 and show that the sizing agent of the instant invention provided both improved print quality and improved ink penetration.

TABLE 4

| Sizing Agent of | Print Quality (mm²) | | Ink Penetration (seconds) | |
| --- | --- | --- | --- | --- |
| Example No. | 2 lb/ton | 4 lb/ton | 2 lb/ton | 4 lb/ton |
| 8 | 1.785 | 1.729 | 256 | 335 |
| 2C | 1.821 | 1.760 | 220 | 237 |

EXAMPLE 10

A sizing agent was prepared without a monomer of (2) as follows: About 0.1 part ferrous sulfate heptahydrate was added to about 76.4 parts of a stabilizing agent prepared as in Example A, followed by 9.6 parts styrene and 7.9 parts methyl acrylate. The reaction vessel was heated to about 58° C. under a nitrogen atmosphere. About 0.4 part hydrogen peroxide and about 3.4 parts water were added over the course of about 2.5 hours while maintaining the temperature at about 60°±3° C. About 0.03 part hydrogen peroxide and 0.27 part water were then added to reduce residual monomer, followed by 0.3 part sodium hydroxide and 0.8 part water. The resulting sizing agent was an aqueous dispersion having 17.6% formed polymer solids and 15.7% stabilizing agent, by weight based on total weight (1.12:1 ratio).

EXAMPLE 11

Sizing agents prepared as in Examples 10 and 2C were used to size paper by the general tubsizing procedure described above. The effectiveness of sizing was determined by the Ink Penetration test (at sizing levels of 2 lb/ton and 4 lb/ton) as described above. The results are provided below in Table 5 and show that the sizing agent of the instant invention provided improved ink penetration.

TABLE 5

| Sizing Agent of | Ink Penetration (seconds) | |
| --- | --- | --- |
| Example No. | 2 lb/ton | 4 lb/ton |
| 10 | 256 | 370 |
| 2C | 220 | 237 |

EXAMPLE 12

A sizing agent was prepared as follows: About 0.1 part ferrous sulfate heptahydrate was added to about 76.4 parts of a stabilizing agent prepared as in Example A, followed by 8.1 parts styrene, 8.6 parts butyl acrylate and 0.9 parts ethyl acrylate The reaction vessel was heated to about 58° C. under a nitrogen atmosphere. About 0.4 part hydrogen peroxide and about 3.4 parts water were added over the course of about 2.5 hours while maintaining the temperature at about 60°±3° C. About 0.03 part hydrogen peroxide and 0.27 part water were then added to reduce residual monomer, followed by 0.3 part sodium hydroxide and 0.8 part water. The resulting sizing agent was an aqueous dispersion having 17.6% formed polymer solids and 15.7% stabilizing agent, by weight based on total weight (1.12:1 ratio).

EXAMPLE 13

Sizing agents prepared as in Examples 12 and 2C were used to size paper by the general tubsizing procedure described above. The effectiveness of sizing was determined by the Print Quality test (at sizing levels of 2 lb/ton and 4 lb/ton) and by the Ink Penetration test (at sizing levels of 2 lb/ton and 4 lb/ton) as described above. The results are provided below in Table 6 and show that the sizing agent of the instant invention provided both improved print quality and improved ink penetration.

TABLE 6

| Sizing Agent of | Print Quality (mm$^2$) | | Ink Penetration (seconds) |
|---|---|---|---|
| Example No. | 2 lb/ton | 4 lb/ton | 4 lb/ton |
| 12 | 1.779 | 1.738 | 281 |
| 2C | 1.821 | 1.760 | 237 |

EXAMPLE 14

A sizing agent was prepared as follows: About 0.1 part ferrous sulfate heptahydrate was added to about 76.4 parts of a stabilizing agent prepared as in Example A, followed by 8.1 parts styrene, 7.3 parts butyl acrylate and 2.1 parts ethyl acrylate. The reaction vessel was heated to about 58° C. under a nitrogen atmosphere. About 0.4 part hydrogen peroxide and about 3.4 parts water were added over the course of about 2.5 hours while maintaining the temperature at about 60°±3° C. About 0.03 part hydrogen peroxide and 0.27 part water were then added to reduce residual monomer, followed by 0.3 part sodium hydroxide and 0.8 part water. The resulting sizing agent was an aqueous dispersion having 17.6% formed polymer solids and 15.7% stabilizing agent, by weight based on total weight (1.12:1 ratio).

EXAMPLE 15

Sizing agents prepared as in Examples 14 and 2C were used to size paper by the general tubsizing procedure described above. The effectiveness of sizing was determined by the Print Quality test (at sizing levels of 2 lb/ton and 4 lb/ton) and by the Ink Penetration test (at sizing levels of 2 lb/ton and 4 lb/ton) as described above. The results are provided below in Table 7 and show that the sizing agent of the instant invention provided both improved print quality and improved ink penetration.

TABLE 7

| Sizing Agent of | Print Quality (mm$^2$) | | Ink Penetration (seconds) | |
|---|---|---|---|---|
| Example No. | 2 lb/ton | 4 lb/ton | 2 lb/ton | 4 lb/ton |
| 14 | 1.789 | 1.735 | 281 | 321 |
| 2C | 1.821 | 1.760 | 220 | 237 |

EXAMPLE 16

A sizing agent was prepared as follows: About 16.5 parts of water and 0.1 part ferrous sulfate heptahydrate were added to about 52.9 parts of the stabilizing agent of Example B at about 68° C., followed by 18.0 parts styrene, 3.6 parts n-butyl acrylate, and 2.4 parts methyl acrylate. The reaction vessel was maintained at about 68° C. and placed under a nitrogen atmosphere. About 0.4 part hydrogen peroxide and about 3.2 parts water were added over the course of about 2.5 hours while maintaining the temperature at about 68°±3° C. About 0.03 part hydrogen peroxide and 0.3 part water were then added to reduce residual monomer, followed by 0.4 part sodium hydroxide and 1.8 part water. The resulting sizing agent was an aqueous dispersion having 24% formed polymer solids and 16% stabilizing agent, by weight based on total weight (1.5:1 ratio).

EXAMPLE 17

A sizing agent was prepared as follows: About 0.1 part ferrous sulfate heptahydrate was added to about 78.5 parts of the stabilizing agent of Example B at about 65° C., followed by 8.5 parts styrene, 6.9 parts n-butyl acrylate, and 2.1 parts methyl acrylate. The reaction vessel was cooled to about 58° C. and placed under a nitrogen atmosphere. About 0.4 part hydrogen peroxide and about 1.4 parts water were added over the course of about 2.5 hours while maintaining the temperature at about 60°±3° C. About 0.03 part hydrogen peroxide and 0.3 part water were then added to reduce residual monomer, followed by 0.3 part sodium hydroxide and 1.3 part water. The resulting sizing agent was an aqueous dispersion having 17.6% formed polymer solids and 15.7% stabilizing agent, by weight based on total weight (1.12:1 ratio).

The following Examples 18–26 illustrate how one may vary the comonomer content, total monomer content, and stabilizing agent content of the sizing agents within the scope of the instant invention.

EXAMPLE 18

Sizing agents prepared as in Examples 16 and 17 were used to size paper by the general tubsizing procedure described above. The effectiveness of sizing was determined by the Print Quality test; by the Ink Penetration test; by the Optical Density test; and by the Color Density test, each at sizing levels of 2 lb/ton and 4 lb/ton and conducted as described above. The results are provided below in Tables 8 and 9 and show the effects of varying the comonomer content and total monomer content on sizing effectiveness.

TABLE 8

| Sizing Agent of | Print Quality (mm$^2$) | | Ink Penetration (seconds) | |
|---|---|---|---|---|
| Example No. | 2 lb/ton | 4 lb/ton | 2 lb/ton | 4 lb/ton |
| 16 | 1.954 | 1.861 | 152 | 271 |
| 17 | 1.908 | 1.871 | 113 | 143 |

TABLE 9

| Sizing Agent of | Optical Density (mm$^2$) | | Color Density (mm$^2$) | |
|---|---|---|---|---|
| Example No. | 2 lb/ton | 4 lb/ton | 2 lb/ton | 4 lb/ton |
| 16 | 1.17 | 1.204 | 0.98 | 0.942 |
| 17 | 1.156 | 1.184 | 0.928 | 0.886 |

EXAMPLE 19

A sizing agent was prepared as follows: About 51.2 parts of water and 0.04 part ferrous sulfate heptahydrate were added to about 37.7 parts of the stabilizing agent of Example B at about 48° C., followed by 3.5 parts styrene, 3.1 parts n-butyl acrylate, and 2.0 parts methyl acrylate. The reaction vessel was maintained at about 48° C. and placed under a nitrogen atmosphere. About 0.1 part hydrogen peroxide and about 1.2 parts water were added over the course of about 2.5 hours while maintaining the temperature at about 48°±3° C. About 0.03 part hydrogen peroxide and 0.3 part water were then added to reduce residual monomer, followed by 0.2 part sodium hydroxide and 0.6 part water. The resulting sizing agent was an aqueous dispersion having 8.6% formed polymer solids and 11.4% stabilizing agent, by weight based on total weight (0.75:1 ratio).

EXAMPLE 20

Sizing agents prepared as in Examples 19 and 17 were used to size paper by the general tubsizing procedure described above. The effectiveness of sizing was determined by the Optical Density test and by the Color Density test, each at sizing levels of 2 lb/ton and 4 lb/ton and conducted as described above. The results are provided below in Table 10 and show the effect of varying the comonomer content and total monomer content on sizing effectiveness.

TABLE 10

| Sizing Agent of | Optical Density (mm$^2$) | | Color Density (mm$^2$) | |
| --- | --- | --- | --- | --- |
| Example No. | 2 lb/ton | 4 lb/ton | 2 lb/ton | 4 lb/ton |
| 19 | 1.148 | 1.176 | 0.92 | 0.92 |
| 17 | 1.156 | 1.184 | 0.928 | 0.886 |

EXAMPLE 21

A sizing agent was prepared as follows: About 0.1 part of water and 0.1 part ferrous sulfate heptahydrate were added to about 75.3 parts of the stabilizing agent of Example B at about 58° C., followed by 6.9 parts styrene, 6.2 parts n-butyl acrylate, and 4.1 parts methyl acrylate. The reaction vessel was cooled to about 48° C. and placed under a nitrogen atmosphere. About 0.5 part hydrogen peroxide and about 4.7 parts water were added over the course of about 2.5 hours while maintaining the temperature at about 51°±3° C. About 0.03 part hydrogen peroxide and 0.3 part water were then added to reduce residual monomer, followed by 0.3 part sodium hydroxide and 1.4 part water. The resulting sizing agent was an aqueous dispersion having 17.2% formed polymer solids and 22.8% stabilizing agent, by weight based on total weight (0.75:1 ratio).

EXAMPLE 22

Sizing agents prepared as in Examples 21 and 17 were used to size paper by the general tubsizing procedure described above. The effectiveness of sizing was determined by the Optical Density test and by the Color Density test, each at a sizing level of 2 lb/ton and conducted as described above. The results are provided below in Table 11 and show the effects of varying the comonomer content and stabilizing agent content on sizing effectiveness.

TABLE 11

| Sizing Agent of Example No. | Optical Density (mm$^2$) 2 lb/ton | Color Density (mm$^2$) 2 lb/ton |
| --- | --- | --- |
| 21 | 1.931 | 0.916 |
| 17 | 1.908 | 0.928 |

EXAMPLE 23

A sizing agent was prepared as follows: About 56.6 parts of water and 0.1 part ferrous sulfate heptahydrate were added to about 26.4 parts of the stabilizing agent of Example B at about 68° C., followed by 4.8 parts styrene, 4.3 parts n-butyl acrylate, and 2.9 parts methyl acrylate. The reaction vessel was maintained at about 68° C. and placed under a nitrogen atmosphere. About 0.4 part hydrogen peroxide and about 3.2 parts water were added over the course of about 2.5 hours while maintaining the temperature at about 68°±3° C. About 0.03 part hydrogen peroxide and 0.3 part water were then added to reduce residual monomer, followed by 0.2 part sodium hydroxide and 0.8 part water. The resulting sizing agent was an aqueous dispersion having 12% formed polymer solids and 8% stabilizing agent, by weight based on total weight (1.5:1 ratio).

EXAMPLE 24

Sizing agents prepared as in Examples 23 and 17 were used to size paper by the general tubsizing procedure described above. The effectiveness of sizing was determined by the Print Quality test; by the Ink Penetration test; by the Optical Density test; and by the Color Density test, each at sizing levels of 2 lb/ton and 4 lb/ton and conducted as described above. The results are provided below in Tables 12 and 13 and show the effects of varying the comonomer content and stabilizing agent content on sizing effectiveness.

TABLE 12

| Sizing Agent of | Print Quality (mm$^2$) | | Ink Penetration (seconds) | |
| --- | --- | --- | --- | --- |
| Example No. | 2 lb/ton | 4 lb/ton | 2 lb/ton | 4 lb/ton |
| 23 | 1.892 | 1.833 | 157 | 188 |
| 17 | 1.908 | 1.871 | 113 | 143 |

TABLE 13

| Sizing Agent of | Optical Density (mm$^2$) | | Color Density (mm$^2$) | |
| --- | --- | --- | --- | --- |
| Example No | 2 lb/ton | 4 lb/ton | 2 lb/ton | 4 lb/ton |
| 23 | 1.152 | 1.198 | 0.974 | 0.964 |
| 17 | 1.156 | 1.184 | 0.928 | 0.886 |

EXAMPLE 25

A sizing agent was prepared as follows: About 10.2 parts of water and 0.1 part ferrous sulfate heptahydrate were added to about 63.0 parts of the stabilizing agent of Example C at about 58° C., followed by 15.0 parts styrene, 3.9 parts n-butyl acrylate, and 1.2 parts methyl acrylate. The reaction vessel was maintained at about 58° C. and placed under a nitrogen atmosphere. About 0.4 part hydrogen peroxide and about 3.9 parts water were added over the course of about 2.5 hours while maintaining the temperature at about 58°±2° C. About 0.04 part hydrogen peroxide and 0.4 part water were then added to reduce residual monomer, followed by 0.4 part sodium hydroxide and 1.2 parts water. The resulting sizing agent was an aqueous dispersion having 20% formed polymer solids and 13.4% stabilizing agent, by weight based on total weight (1.5:1 ratio).

EXAMPLE 26

Sizing agents prepared as in Examples 25 and 6 were used to size paper by the general tubsizing procedure described above. The effectiveness of sizing was determined by the Print Quality test (at sizing levels of 2 lb/ton and 4 lb/ton) and by the Ink Penetration test (at sizing levels of 2 lb/ton and 4 lb/ton) as described above. The results are provided below in Table 14 and show the effects of varying the comonomer content on sizing effectiveness.

TABLE 14

| Sizing Agent of | Print Quality (mm²) | | Ink Penetration (seconds) | |
|---|---|---|---|---|
| Example No. | 2 lb/ton | 4 lb/ton | 2 lb/ton | 4 lb/ton |
| 25 | 1.900 | 1.845 | 237 | 339 |
| 6 | 1.860 | 1.814 | 268 | 325 |

EXAMPLE 27

The particle sizes of the sizing agents of Examples 2C and 17 were determined by transmission electron microscopy and by light scattering as described above. The results are provided below in Table 16. These results show that the particle size and particle size distribution of the sizing agent of Example 17 are smaller than the comparative sizing agent of Example 2C.

TABLE 16

| | Light Scattering | | Microscopy | |
|---|---|---|---|---|
| Sizing Agent of Example No. | Median size, microns | % smaller than 1 micron | Mean Particle size, nm | Poly-dispersity Index |
| 2C | 30.4 | 18.7% | 62 | 1.07 |
| 17 | 0.2 | 96.8% | 50 | 1.04 |

EXAMPLE 28C (Comparative)

A sizing agent was prepared as follows: About 0.4 part ferrous sulfate heptahydrate was added to about 78.2 parts of the stabilizing agent of Example A at about 58° C., followed by 8.2 parts styrene and 9.5 parts n-butyl acrylate. The reaction vessel was maintained at about 58° C. and placed under a nitrogen atmosphere. About 0.4 part hydrogen peroxide and about 1.5 parts water were added over the course of about 150 minutes while maintaining the temperature at about 60°±3° C. About 0.03 part hydrogen peroxide and 0.1 part water were then added to reduce residual monomer, followed by 0.3 part sodium hydroxide and 1.4 parts water. The resulting sizing agent was an aqueous dispersion having 17.7% formed polymer solids and 15.8% stabilizing agent, by weight based on total weight (1.1 2:1 ratio).

EXAMPLE 29

Sizing agents prepared as in Examples 6, 8, 10, 12, 13 and 28C were prepared as described above. During preparation, the initiation time was determined by measuring the time elapsed from when the initiator was first added to the time when the temperature began to rise, as recorded by a thermocouple inserted into the reaction mixture. The time to maximum temperature was also determined by measuring the time elapsed from when the temperature first began to rise to when the temperature reached a maximum. The initiation times and times to maximum temperature are provided below in Table 17. These results demonstrate the improved rates of production achievable by the practice of the instant invention.

TABLE 17

| Sizing Agent of Example No. | Initiation Time, minutes | Time to Final Temperature, minutes |
|---|---|---|
| 6 | 2 | 13 |
| 8 | 5 | 26 |
| 10 | 3 | 20 |
| 12 | 5 | 47 |
| 13 | 5 | 37 |
| 28C | 14 | 65 |

EXAMPLE 30

During the preparation of the sizing agents of Example 17 and 2C, the monomer conversion was monitored as a function of time as shown below in Table 19. These results show that conversion is faster and more complete for Example 17 than for comparative Example 2C.

TABLE 19

| Time, minutes | % Conversion for Sizing Agent of Example 17 | % Conversion for Sizing Agent of Example 2C |
|---|---|---|
| 0 | 0 | 0 |
| 6 | 30.7 | 8.4 |
| 16 | 44.5 | 10.6 |
| 32 | 82.4 | 43.4 |
| 65 | 98.4 | 86.7 |
| 99 | 99.2 | 98.8 |
| 128 | 99.8 | 99.4 |
| 150 | 100 | 99.7 |

We claim:

1. A method for making a sizing agent comprising
   (I) forming a mixture comprised of
      (A) 5–40%, by weight based on total weight, of ethylenically unsaturated monomers comprised of
         (1) 20–80%, by mole based on total moles of monomers, of at least one monomer selected from the group consisting of styrene, $C_1$–$C_4$ alkyl substituted styrene, alpha-methyl styrene and ring-halogenated styrene,
         (2) 0–80%, by mole based on total moles of monomers, of at least one $C_4$–$C_{12}$ alkyl (meth) acrylate monomer,
         (3) 5–50%, by mole based on total moles of monomers, of at least one monomer selected from the group consisting of methyl acrylate, ethyl acrylate, and propyl acrylate, and
      (B) a stabilizing agent selected from the group consisting of polysaccharide and synthetic water-soluble polymer having a weight average molecular weight of 1,000 or greater,
   wherein the weight ratio of said (A) to said (B) in said mixture is in the range of about 0.6:1 to about 1.7:1 and wherein said mixture is substantially free of both (i) ethylenically unsaturated carboxylic and sulfonic acids and salts thereof and (ii) emulsifier or surfactant having a molecular weight of less than 1,000, and (II) copolymerizing said ethylenically unsaturated monomers in the presence of water to form a dispersion.

2. A method as claimed in claim 1 wherein said (1) is styrene, said (2) is butyl acrylate, and said (3) is methyl acrylate.

3. A method as claimed in claim 1, wherein said weight ratio of said (A) to said (B) in said mixture is in the range of about 0.8:1 to about 1.5:1.

4. A method as claimed in claim 1 wherein the amount of said (1) is 40–60%, by mole based on total moles of monomers.

5. A method as claimed in claim 1 wherein the amount of said (2) is 20–50%, by mole based on total moles of monomers.

6. A method as claimed in claim 1 wherein the amount of said (3) is 10–20%, by mole based on total moles of monomers.

7. A method as claimed in claim 1 wherein said stabilizing agent is a polysaccharide.

8. A method as claimed in claim 1 which further comprises adding a polymerization initiator at or near the end of said copolymerizing to reduce the residual monomer content of said aqueous dispersion.

9. A sizing agent comprised of
(A) 5–40%, by weight based on total weight, of a water-insoluble polymer comprised of recurring units of
(1) 20–80%, by mole based on total moles of recurring units, of at least one recurring unit selected from the group consisting of styrene, $C_1$–$C_4$ alkyl substituted styrene, alpha-methyl styrene and ring-halogenated styrene,
(2) 0–80%, by mole based on total moles of recurring units, of at least one $C_4$–$C_{12}$ alkyl (meth)acrylate recurring unit,
(3) 5–50%, by mole based on total moles of recurring units, of at least one recurring unit selected from the group consisting of methyl acrylate, ethyl acrylate, and propyl acrylate, and
(B) a stabilizing agent selected from the group consisting of polysaccharide and synthetic water-soluble polymer having a weight average molecular weight of 1,000 or greater,
wherein the weight ratio of said (A) to said (B) in said sizing agent is in the range of about 0.6:1 to about 1.7:1, wherein said sizing agent is substantially free of emulsifier or surfactant having a molecular weight of less than 1,000, and wherein said water-insoluble polymer is substantially free of acidic recurring units.

10. A sizing agent as described in claim 9, wherein said (1) is styrene, said (2) is butyl acrylate, and said (3) is methyl acrylate.

11. A sizing agent as described in claim 9, wherein said stabilizing agent is a cationic waxy maize starch.

12. A sizing agent as described in claim 9, wherein said weight ratio of said (A) to said (B) in said sizing agent is in the range of about 0.9:1 to about 1.2:1.

13. A sizing agent as described in claim 9, wherein the amount of said (1) is 30–75%, by mole based on total moles of monomers.

14. A sizing agent as described in claim 9, wherein the amount of said (2) is 10–60%, by mole based on total moles of monomers.

15. A sizing agent as described in claim 9, wherein the amount of said (3) is 8–30%, by mole based on total moles of monomers.

16. A sizing agent as described in claim 9, wherein the amount of said (1) is 40–60%, the amount of said (2) is 20–50%, and the amount of said (3) is 10–20%, by mole based on total moles of recurring units.

17. A sizing agent as described in claim 9, wherein said weight ratio of said (A) to said (B) in said sizing agent is in the range of about 0.8:1 to about 1.5:1, and wherein the amount of said (1) is 40–60%, the amount of said (2) is 20–50%, and the amount of said (3) is 10–20by mole based on total moles of recurring units.

18. A method of sizing paper, comprising
(a) providing paper stock;
(b) providing the sizing agent of claim 9;
(c) forming a web from said paper stock; and
(d) mixing said sizing agent with said paper stock or applying said sizing agent to said web, in an amount effective to size paper that is formed from said web.

19. A method as claimed in claim 18 wherein said sizing agent is applied to said web by a method selected from the group consisting of spraying and size pressing.

20. A method of sizing paper, comprising
(a) providing paper stock;
(b) providing the sizing agent of claim 9;
(c) forming a web from said paper stock; and
(d) mixing said sizing agent with said paper stock or applying said sizing agent to said web, in an amount effective to size paper that is formed from said web, wherein said paper that is formed from said web has a degree of sizing that is greater than the degree of sizing obtained when a sizing agent that does not contain recurring units selected from the group consisting of methyl acrylate, ethyl acrylate, and propyl acrylate is used in place of the sizing agent of claim 9.

* * * * *